United States Patent
Laghezza et al.

(10) Patent No.: US 11,525,908 B2
(45) Date of Patent: Dec. 13, 2022

(54) RADAR APPARATUSES AND METHODS INVOLVING DETERMINATION OF VELOCITY OF AN OBJECT

(71) Applicant: NXP B.V., Eindhoven (NL)

(72) Inventors: Francesco Laghezza, Eindhoven (NL); Feike Guus Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 199 days.

(21) Appl. No.: 16/790,319

(22) Filed: Feb. 13, 2020

(65) Prior Publication Data
US 2021/0255303 A1 Aug. 19, 2021

(51) Int. Cl.
*G01S 13/58* (2006.01)
*G01S 13/34* (2006.01)
*G01S 7/35* (2006.01)
*G01S 7/41* (2006.01)
*G01S 13/536* (2006.01)

(52) U.S. Cl.
CPC ............ *G01S 13/581* (2013.01); *G01S 7/354* (2013.01); *G01S 7/415* (2013.01); *G01S 13/343* (2013.01); *G01S 13/536* (2013.01); *G01S 13/583* (2013.01); *G01S 13/584* (2013.01)

(58) Field of Classification Search
CPC .................................................. G01S 13/581
See application file for complete search history.

(56) References Cited

U.S. PATENT DOCUMENTS

| | | | |
|---|---|---|---|
| 2015/0084806 A1 | 3/2015 | Rohling | |
| 2015/0323660 A1* | 11/2015 | Hampikian | G01S 13/345 342/109 |
| 2016/0124086 A1* | 5/2016 | Jansen | G01S 13/931 342/107 |
| 2017/0131392 A1* | 5/2017 | Schoor | G01S 13/584 |
| 2017/0131396 A1* | 5/2017 | Schoor | G01S 13/0209 |
| 2018/0172813 A1* | 6/2018 | Rao | G01S 13/931 |
| 2018/0203105 A1 | 7/2018 | Kuehnle et al. | |
| 2019/0250249 A1* | 8/2019 | Raphaeli | G01S 7/295 |
| 2020/0110167 A1* | 4/2020 | Harrison | G01S 13/89 |

* cited by examiner

*Primary Examiner* — Erin F Heard
*Assistant Examiner* — Ismaaeel A. Siddiquee

(57) ABSTRACT

Embodiments are directed to a method for determining velocity of an object. The method includes in response to two interleaved chirp sequences being sent towards the object, processing responsive chirps of each of the two interleaved chirp sequences independently from one another to produce respective Doppler-spectrum data sets, and calculating the velocity of the object based on the respective Doppler-spectrum data sets. Each of the interleaved chirp sequences being characterized by a common time spacing between respective chirps of the respective chirp sequence, and each chirp of one of the chirp sequences being offset by an amount of time that is different than the common time spacing.

19 Claims, 8 Drawing Sheets

RADAR APPARATUSES AND METHODS INVOLVING DETERMINATION OF VELOCITY OF AN OBJECT

OVERVIEW

Aspects of various embodiments are directed to radar methods and apparatuses for determining a velocity of an object.

Radar apparatuses may be used in a variety of applications. For example, automotive radar apparatuses, such as frequency modulated continuous wave (FMCW) radar apparatuses, may be used for cruise control, collision warning, blind spot warning, lane change assist, parking assist, and rear collision warning, among other applications. Radar apparatuses may transmit a sequence of equally spaced chirps, which are frequency ramps, in a frame. The reflected signal is down-converted, digitalized and processed to estimate range and velocity of objects surrounding the radar apparatus.

These and other matters have presented challenges to efficiencies of radar implementations, for a variety of applications.

SUMMARY

Various example embodiments are directed to issues such as those addressed above and/or others which may become apparent from the following disclosure concerning determining a velocity of an object via a radar type apparatus.

In certain example embodiments, aspects of the present disclosure involve independent processing of two interleaved chirp sequences, sent as a single set of chirps in a frame, to calculate a velocity of an object.

In a more specific example embodiment, a method for determining a velocity of an object includes, in response to two interleaved chirp sequences being sent towards the object, processing responsive chirps of each of the two interleaved chirp sequences independently from one another to produce respective Doppler-spectrum data sets, and calculating the velocity of the object based on the respective Doppler-spectrum data sets. Each of the interleaved chirp sequences being characterized by a common time spacing between respective chirps of the respective chirp sequence, and each chirp of one of the chirp sequences being offset by an amount of time that is different than the common time spacing.

The method may further include generating and sending the two interleaved chirp sequences, and in response, receiving the responsive chirps corresponding to reflections of the chirps of the two interleaved chirp sequences from the object. For example, the method further includes generating and sending the two interleaved chirp sequences as a single set of chirps, wherein chirps of one of the two interleaved chirp sequences include even-indexed chirps of the single set of chirps and wherein chirps of the other of the two interleaved chirp sequences include odd-indexed chips of the single set of chirps having the offset between the even-indexed and odd-indexed chirps. Processing the responsive chirps may include processing the even-indexed chirps and the odd-indexed chirps separately, and in response, generating a first estimate of a velocity and range for the object using the even-indexed chirps and generating a second estimate of the velocity and range for the object using the odd-indexed chirps.

In various embodiments, calculating the velocity of the object further includes generating a direct estimate of the velocity of the object for each of the interleaved chirp sequences using the responsive chirps, and providing an indirect estimate of the velocity using a phase difference between the interleaved chirp sequences. For example, calculating the velocity may include comparing the direct estimate to the indirect estimate.

In another specific example embodiment, a method includes sending two interleaved chirp sequences, each of the chirp sequences characterized by a common time spacing between respective chirps of the chirp sequence, and each chirp of one of the chirp sequences being offset by an amount of time that is different than the common time spacing. The method further includes, in response to sending the two interleaved chirp sequences, processing responsive chirps of each of the two interleaved chirp sequence independently from one another to produce respective Doppler-spectrum data sets, and calculating the velocity of the object based on the respective Doppler-spectrum data sets. For example, the method may include generating and sending the two interleaved chirp sequences as a single sequence of chirps via a radar transceiver. The offset may be associated with or cause a phase difference between detected peaks of the respective Doppler-spectrum data sets.

Calculating the velocity of the object may include generating a direct estimate of a velocity and a distance of the object for each of the chirp sequences using the responsive chirps, and providing an indirect estimate of the velocity using a phase difference between the two interleaved chirp sequences. The method may further include comparing the indirect estimate of the velocity to the direct estimates of the velocity, and in response to the indirect estimate being within a threshold of the direct estimates, calculating the velocity as a value corresponding to the direct estimates of the velocity. In other examples, the method further includes comparing the indirect estimate of the velocity to the direct estimates of the velocity, and in response to the indirect estimate being outside a threshold of the direct estimates, calculating the velocity using an unfolding-based velocity estimation.

Other specific example embodiments are directed to an apparatus comprising circuitry to, in response to two interleaved chirp sequences being sent towards an object, process responsive chirps of each of the two interleaved sequences independently from one another to produce respective Doppler-spectrum data sets, and to calculate a velocity of the object based on the respective Doppler-spectrum data sets. Each of the chirp sequences may be characterized by a common time spacing between respective chirps of the chirp sequence, and each chirp of one of the sequences being offset by an amount of time that is different than the common time spacing. The circuitry may process each of the plurality of respective sequences as waveforms, associated with the responsive chirps of each of the two interleaved chirp sequences, as a sample of a Doppler component (e.g., velocity, range).

In a number of embodiments, the circuitry includes a radar transceiver to send the two interleaved chirp sequences as a single set of chirps in a radar frame and receive the responsive chirps, and processing circuitry to process the responsive chirps and calculate the velocity. For example, the circuitry includes a radar-signal frequency modulated continuous wave (FMCW) transmitter to send the two interleaved chirp sequences as the single set of chirps in the radar frame and receive the responsive chirps, and processing circuitry to process the responsive chirps and calculate the velocity. In other embodiments and/or in addition, circuitry includes a radar-signal FMCW receiver to send the two interleaved chirp sequences as the single set of chirps in the radar frame and receive the responsive chirps, and processing circuitry to process the responsive chirps and calculate the velocity.

The circuitry is to provide a direct estimate of the velocity of the object for each of the interleaved chirp sequences using the responsive chirps, provide an indirect estimate of the velocity using a phase difference between the interleaved chirp sequences, and calculate the velocity of the object using the direct estimate and the indirect estimate. The circuitry may compare the direct estimate and the indirect estimate, and in response to the indirect estimate being within a threshold of the direct estimate, use the direct estimate as the calculated velocity. Further and/or alternatively, the circuitry may compare the direct estimate and the indirect estimate, and in response to the indirect estimate being outside a threshold of the direct estimate, calculating the velocity using the direct and indirect estimates and unfolding-based velocity estimation.

The above discussion/summary of examples is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
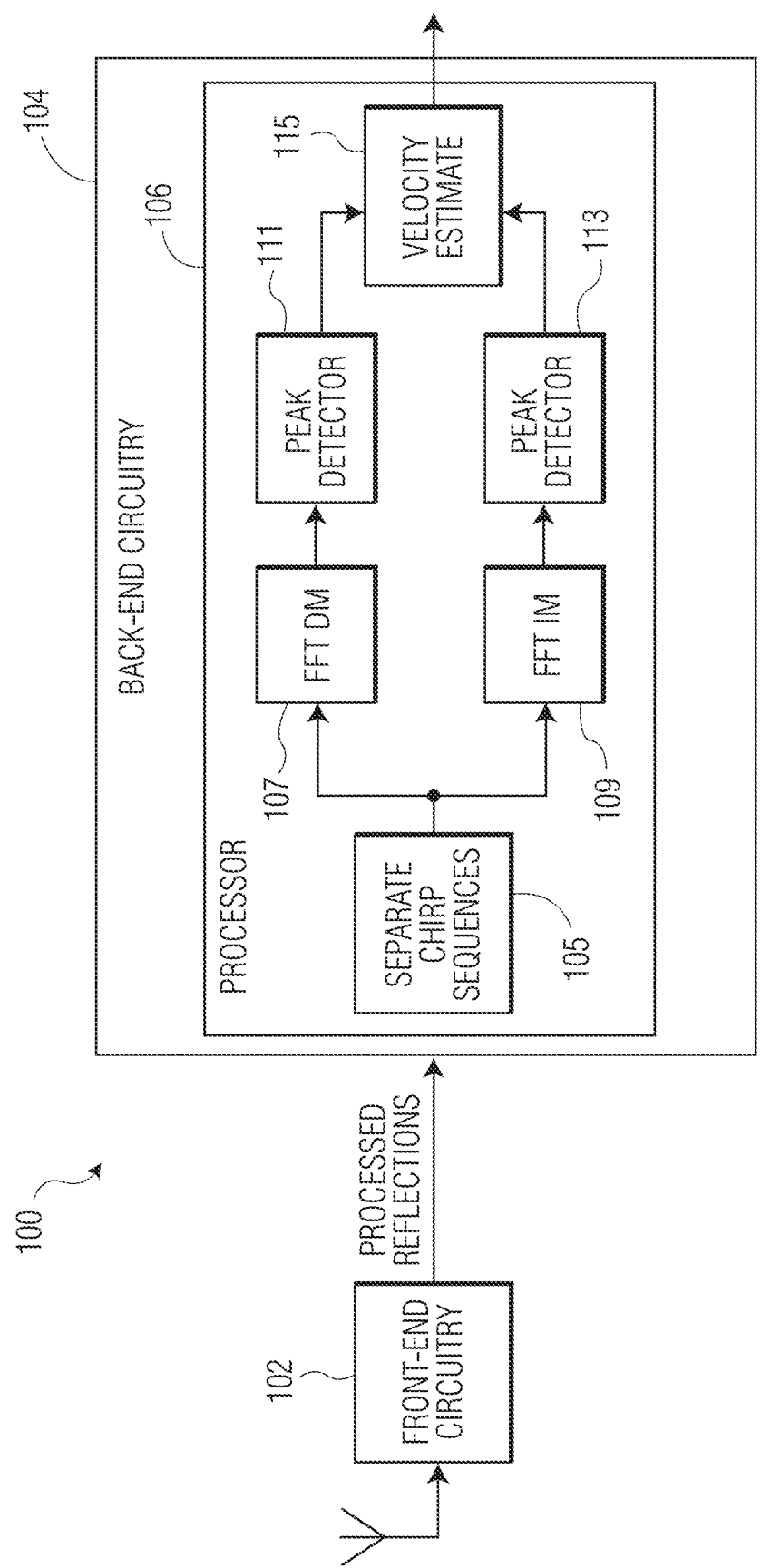
FIG. 1 is an example radar apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving determining a velocity of an object. In certain implementations, aspects of the present disclosure have been shown to be beneficial when used in the context of independent processing of multiple (e.g., two or three) interleaved chirp sequences, sent as a single set of chirps in a radar frame, to calculate a velocity of an object. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In many radar systems, such as in frequency modulated continuous wave (FMCW) radar systems, consecutive sequences of equally spaced chirps may be transmitted and received to generate radar signals. In certain such radar systems, after each sequence of chirps, there is an idle time for processing the resulting radar signals. The acquisition time of the sequence of chirps and the resulting idle time form a radar frame. The reflected signal is mixed with the transmitted signal to form an intermediate frequency signal that is filtered and digitized. Signal processing is performed on the digitized intermediate frequency signal to extract the range and velocity (and optionally the angle) of an object in view of the radar system. The maximum unambiguous velocity that may be measured is an estimation of the velocity of object moving at a velocity that is smaller than the maximum measurable velocity. The maximum unambiguous velocity may be erroneous in both magnitude and sign. As an example, a radar system with a maximum measurable velocity of 80 kilometers per hour (kmph) may estimate an object moving at 85 kmph as moving at a velocity of negative 75 kmph. Embodiments in accordance with the present disclosure are directed to determining a velocity of an object by radar using time interleaved chirp sequences, thereby increasing a maximum unambiguous velocity measure of the apparatus while maintaining a high frame rate. The interleaved chirp sequences may be generated by N chirp ramp sequences (N being an integer greater than one) in which a time-offset is located between the odd-indexed chirps with respect to the even-indexed chirps. A digital signal processing technique separates the odd and even chirps and creates two separate sequences (e.g., processing flows) which leads to two separate range and velocity estimations (e.g., direct range and velocity measurements) of the same scenario. The velocity estimations may be implemented by single or multimode radar apparatuses where different modes are active in the same radar system cycle.

Velocity of an object in view of the radar apparatus may be estimated by measuring a phase difference across consecutively received chirps. A large chirp time $T_{chirp}$ (e.g., the elapse time from a start of a chirp to the start of the next chirp) may result in phase rollover that causes errors in the velocity estimate. A radar apparatus with small velocity resolution may require a long chirp time $T_{chirp}$ and a large number of processed chirps $N_{chirp}$, such that $$\Delta V_{res} = \frac{3.6\lambda}{2(T_{Meas})}, \text{ where } T_{Meas} = N_{chirp}T_{chirp}.$$

With a large $T_{chirp}$, the radar apparatus unambiguously detect objects up to a velocity $$V_{MAX}^{unambiguous} = \frac{3.6\lambda}{4(T_{chirp})},$$

where $\lambda$ is the wavelength corresponding to the center frequency of a chirp. As such the maximum unambiguous velocity measured by the radar Vmax is inversely proportional to the chirp time. Various factors limit the minimum achievable $T_{chirp}$, and thus the maximum Vmax. Example factors include the bandwidth spanned by a chirp and the slope of the chirp. For example, a high radar frame rate may limit the available time for the measurement $T_{Meas}$ and for processing $T_{Proc}$), such that $T_{Frame}=T_{Meas}+T_{Proc}$. Embodiments in accordance with the present disclosure involve use of two interleaved sequences of chirps, which are transmitted as a single sequence, such that the $T_{Frame}$ is not enlarged and the velocity ambiguity is resolved. More specifically, the velocity is determined by associating the phase difference between the detected peaks to an indirect velocity measurement. In some examples, the unambiguous velocity of an object is corrected by comparing the different velocity obtained by the direct and the indirect methods.

A number of embodiments are directed to a radar method for determining a velocity of an object. The method includes processing responsive chirps of each of the two interleaved chirp sequences independently from one another to produce respective Doppler-spectrum in response to two interleaved chirp sequences being sent towards the object. Each of the two interleaved chirp sequences are characterized by a common time spacing between respective chirps of the respective chirp sequence, and each chirp of one of the chirp sequences being offset by an amount of time that is different than the common time spacing. In various examples, the method may further include generating and sending the two interleaved chirp sequences, and in response, receiving the responsive chirps corresponding to reflections of the chirps of the two interleaved chirp sequences from the object. The velocity of the object is calculated based on the respective Doppler-spectrum data sets.

As described above, the method may include generating and sending the two interleaved chirp sequences, such as a single set of chirps. For example, chirps of one of the two interleaved chirp sequences include even-indexed chirps of the single set of chirps and chirps of the other of the two interleaved chirp sequences include odd-indexed chips of the single set of chirps having the offset between the even-indexed and odd-indexed chirps. Due to the common time spacing and time offset, each sequence has a common time spacing between respective chirps (e.g., two adjacent even-indexed chirps have the same common time spacing as two adjacent odd-indexed chirps) and different spacing between chirps of the different sequences. For example, the time space after even-indexed chirp and before odd-indexed chirp includes the time offset (e.g., time spacing is $T_D+T_{offset}$), and the time space after odd-indexed chirp and before even indexed chirp does not have the time offset (e.g., time spacing is $T_D$).

Other example embodiments are directed to apparatuses having circuitry which may implement the above described method, as further described herein.

Turning now to the figures, FIG. 1 is an example radar apparatus, in accordance with the present disclosure. The apparatus 100 is or can include a radar system, such as an automobile radar system, having circuitry such as the illustrated front-end (radar) circuitry 102 and back-end (radar) circuitry 104. The apparatus 100 may increase a maximum velocity measure while keeping a high frame rate through the use of two interleaved chirp sequences and processing of an additional (indirect) velocity measure.

The front-end circuitry 102 sends chirp sequences and receives responsive chirps. The front-end circuitry 102 may include transceiver circuitry and signal processor. The transceiver circuitry is arranged with an antenna to output chirp sequences and to receive the return chirps indicative of reflections from the output chirps, sometimes represented as frequency modulated continuous wave (FMCW) signal. As further described below, the chirp sequences transmitted in a frame may include two interleaved chirp sequences, with each of the interleaved chirp sequences being characterized by a common time spacing between respective chirps of the respective chirp sequence, and each chirp of one of the chirp sequences being offset by an amount of time that is different than the common time spacing. For example, the front-end circuitry 102 may be configured to generate and send the two interleaved chirp sequences as a single sequence of chirps via the radar transceiver. The offset may be associated with or cause a phase difference between detected peaks of resulting Doppler-spectrum data sets (e.g., Doppler maps generated using the chirp sequences and reflections).

As may be appreciated, a signal processor is configured and arranged with the transceiver circuitry (at least a portion of which may be part of the front-end circuitry) to mix the output chips with the responsive chirps (e.g., the reflections) and to generate a digital stream of input data from the mixture. The signal processor can include an analog-to-digital converter (ADC) and a timing circuit. In specific embodiments, the front-end circuitry may include a transmitter (TX), receiver (RX), one or more antennas, a timing circuit and/or an ADC, such circuitry may further include logic/computer circuits for carrying out the related activities (transmitting, receiving, timing control, analog-digital signal conversion, etc.) for each.

The sequence of chirps are sometimes referred to as a frequency ramp signal, are transmitted, hit an object, and comes back to the transceiver circuitry with a given delay. This delay represents the time-of-flight and is used to detect objects and, optionally, estimate their distance from the apparatus 100. For example, both the internal receiver signal and external delayed received signal (e.g., responsive chirps as received by the receiver antenna) may be mixed by a mixer within the receiver (e.g., via receiver mixer or down-converter), and an intermediate frequency (IF) signal may be created, representing the distance of the target.

In certain embodiments, a chirp generator (not shown) such as a phase locked loop (PLL circuit) may be used to generate the appropriate chirp sequence in accordance with the instant disclosure. The chirp sequence is provided/passed along both the transmission and reception paths of the transceiver (e.g., transmitter circuitry and receiver circuitry of the front-end circuitry 102). A chirp in such a sequence may be considered a frequency signal that represents or corresponds to a FMCW signal which has a sweep beginning at the start frequency (F1) and ending at the stop frequency (F2). The ADC circuitry converts the IF signal, which is an analog signal, to the digital data stream which is provided to the back-end circuitry 104.

The apparatus 100 further includes the back-end circuitry 104 that processes the digital data stream using the processing circuitry 106. The back-end circuitry 104 includes the processing circuitry 106, such as a microcontroller, that is used to derive Doppler-spectrum data sets. The Doppler-spectrum data sets may include Doppler information and/or a target map based on the Doppler information or similar/equivalent aggregated or intepreted summary of the digital data stream (e.g., raw radar data) from the responsive (e.g., reflections) chirps. A target map can include information indicative of detected objects and, optionally, an estimated distance from the apparatus 100. In specific embodiments, the target map can be generated using two dimensional fast Fourier transform (2D-FFT) and which shows, for each object, the position and velocity of the object (sometimes herein interchangeably referred to as "a target") relative to the apparatus 100. The target map may be transferred to a display for the user, and/or evaluated by a driver assistance system or an autonomous driving system.

FFTs can be computed for a variety of purposes, such as for deriving a range Doppler image in a FMCW radar system. The FFT execute so called FFT-butterflies. Inside the butterflies, the input data is multiplied by constant coefficients. A large number of multiplications can be computed, as many butterflies are computed per FFT and a number of FFTs are computed for each range-Doppler image. In FMCW radars, the range-Doppler images are computed at a high frame rate.

FMCW radar systems typically have two or more FFTs, one for range and the other for velocity estimations of targets. In some embodiments, FMCW radar systems can have a third FFT that is computed for each range-Doppler bin in the two-dimensional spectrum to obtain an angle of arrival of the signal. This third FFT can have a size corresponding to the number of virtual antennas (referring to at least one physical antenna configured to act as multiple antennas in this radar context). The FMCW system can operate by a timing engine generating a periodic start signal. After each start signal, the TX produces a frequency ramp, e.g., a sinusoidal wave signal with a linearly increasing frequency signal (e.g., a chirp) between e.g., 75 and 76 GHz. This signal is propagated to the antenna and transmitted. The transmitted signal is reflected by the targets and picked up by the RX antenna after it is down-mixed in the RX front-end circuitry. As radio waves travel at the speed of light and the target is at a certain distance, there is a time delay between the signal transmitted and the one received. After mixing of the received signal with the transmitted signal, the time delay results in a sinusoidal wave signal with a particular frequency. This signal is called the beat signal. After sampling of this beat signal by an ADC it is further processed in the digital domain using a number of steps. A range FFT is computed on the samples of each chirp. The resulting FFT output contains peaks if targets are present at different distances (e.g., ranges). In certain applications, targets that are below the noise floor at this stage and a second FFT is needed to provide sufficient processing gain (hence, this state is not 100% correct). The results of a number of range FFTs are stored in a memory. After the range FFT results are stored in the memory, the data in the memory is transposed. After transposition, velocity FFTs are computed. The results of the velocity FFTs are again stored in memory. The resulting data matrix is called the range Doppler map because it contains range and Doppler information about the targets. The range Doppler map is processed and the peaks are identified as targets and a target list is generated as output of the apparatus 100.

Embodiments in accordance with the present disclosure include circuitry which processes the responsive chirps (e.g., the reflections) of each of the interleaved chirp sequences independently from one another to produce respective Doppler-spectrum data sets and to calculate a velocity of the object based on the respective Doppler-spectrum data sets. The circuitry may process each of the plurality of respective sequences as waveforms, associated with the responsive chirps of each of a plurality of respective sequences, as a sample of a Doppler component. The chirps are staggered due to the time offset, which decreases the Tchirp time, compared to transmitting two separate sequences, thus increasing Vmax without decreasing the frame rate. The offset is associated with or causes a phase difference between detected peaks of the respective Doppler-spectrum data sets.

As further described below, calculating the velocity of the object may include generating a direct estimate of a velocity and a distance of the object for each of the chirp sequences using the responsive chirps, and providing an indirect estimate of the velocity using a phase difference between the two interleaved chirp sequences. The circuitry may separate the chirp sequences, at 105, calculate an FFT (e.g., a 2D-FFT) for each chirp sequence, at 107 and 109, detect peaks in the FFTs for each chirp sequence, at 111 and 113, and using the detected peaks, estimate the velocity at 115 (while FFT blocks 107 and 109 refer to DM and IM (respectively for direct and indirect measurements, both FFT blocks yield a direct measurement and indirect measurements may be obtained via the phase difference between both direct measurements) Although the apparatus 100 illustrates the circuitry as including the components of the back-end circuitry 104, the circuitry may include components of the front-end circuitry 102 and/or the back-end circuitry 104. For example, the circuitry includes a radar transceiver (of the front-end circuitry 102) to send the two interleaved chirp sequences and receive the responsive chirps, and the processing circuitry 106 to process the responsive chirps and calculate the velocity. In other examples, the circuitry includes a radar-signal FMCW transmitter and/or radar-signal FMCW receiver of the front-end circuitry 102 to send the two interleaved chirp sequences and receive the responsive chirps, and the processing circuitry 106 to process the responsive chirps and calculate the velocity. In some embodiments, components of the front-end circuitry 102 may process the responsive chirps to generate beat signals and the processing circuitry 106 further processes the beat signals to estimate the velocity, in accordance with the embodiments described herein.

The Vmax of the radar apparatus may be increased by use of the two interleaved chirp sequences which, in interleaved form, may be referred to as $N_{chirp}$. In $N_{chirp}$, a time offset $T_0$ is placed between the odd-indexed and even-indexed chirps (e.g., in the time after the even-indexed chirp and before the odd-indexed chirp), such that the repetition time (e.g., the time from the start of a first even-indexed chirp to the start of a second even-indexed chirp) is $T_0+2T_{ACQ}+2T_D$, with $T_{ACQ}$ being the time for transmitting one chirp (e.g., time for acquiring sample data) and $T_D$ being the dwell time (e.g., processing). The total measurement time is $T_{Meas}=N_{chirp}(T_0+2T_{ACQ}+2T_D)$ and the velocity resolution corresponds to $$\Delta V_{res} = \frac{3.6\lambda}{2(T_{Meas})},$$

where λ is the wavelength associated to the system carrier frequency (note: for the duration, the last dwell time may be discounted). An illustration of such chirp sequencing is shown by way of FIGS. 2A, 2B and 2C.

Calculating the velocity of the object may include generating a direct estimate of the velocity of the object for each of the interleaved chirp sequences using the responsive chirps, and providing an indirect estimate of the velocity using a phase difference between the interleaved chirp sequences. For example, the even and odd-indexed chirps may be processed separately (e.g., two separate processing flows), resulting in two separate range velocity estimations of the same scene (e.g., a first estimate of the velocity and range for the object using the even-indexed chirps and a second estimate of the velocity and range using the odd-indexed chirps). More specifically, two Range-Doppler images are created, one for each of the interleaved chirp sequences. The number of processed chirps per sequences are $0.5N_{chirp}$, as the sequence includes two interleaved chirp sequences. Two Range-Doppler images can be created for the two chirp sequences using 2D-FFT, such as described above, and objects appear in the same range-velocity bins for both processed chirp sequences. Since the measurement time $T_{Meas}$ remains the same, the velocity resolution of both the sequences is $$\Delta V_{res} = \frac{3.6\lambda}{2(T_{Meas})}.$$

In the Range-Doppler images, the range measurement is unambiguous. Considering an unambiguous range measurement, the velocity measurement $v_D^{DM}$ can have ambiguities since the maximum detectable unambiguous velocity is $$V_{MAX}^{DM} = \frac{3.6\lambda}{4(T_0 + 2T_{ACQ} + 2T_D)},$$

with DM standing for a direct measurement of the velocity associated to a moving target.

The relative time offset of $T_{OFFSET} = T_0 + T_{ACQ} + T_D$ is present between the two sets of chirps. The time offset can be associated with a phase difference between the detected peaks of the two different Range-Doppler images. The phase difference $\Delta\emptyset$ between the detected peaks of the two Range-Doppler images may be used to create an indirect measurement of the velocity $$v_D^{IM} = \frac{\Delta\emptyset}{2\pi(T_0 + T_{ACQ} + T_D)} \cdot \frac{\lambda}{2}.$$

This velocity measurement can be also ambiguous $$V_{MAX}^{IM} = \frac{3.6\lambda}{4(T_0 + T_{ACQ} + T_D)}.$$

The velocity of the object may further be calculated by comparing the direct measure(s) to the indirect measure. The resolution of the indirect estimation (IM) depends on the precision of the phase estimation of the two peaks associated with the same object. For example (with "std" representing standard deviation):

$$v_D^{IM} = \frac{\Delta\emptyset}{2\pi(T_0 + T_{ACQ} + T_D)} \cdot \frac{\lambda}{2} = \frac{\emptyset^{RD1} - \emptyset^{RD2}}{2\pi(T_0 + T_{ACQ} + T_D)} \cdot \frac{\lambda}{2} \Rightarrow \Delta v_D^{IM} = \frac{2std\{\Delta\emptyset\}}{2\pi(T_0 + T_{ACQ} + T_D)} \cdot \frac{\lambda}{2} = \frac{std\{\Delta\emptyset\}}{\pi(T_0 + T_{ACQ} + T_D)} \cdot \frac{\lambda}{2},$$

and where $\emptyset^{RD1}$ and $\emptyset^{RD2}$ correspond to even indices and odd indices, respectively. As such, there are two velocity measurements of the same targets available. If, for a specific object, the two estimated velocity components are equal or within a threshold of one another ($v_D^{IM} = v_D^{DM}$), the true velocity for the specific target corresponds to $v_D^{True} = v_D^{DM}$. In such embodiments, either of the velocity measures may be used as the velocity estimate of the object. For example, the even and odd-indexed chirps may be processed and provide two identical (or near identical) measures of the velocity and range, with either or both (e.g., a weighted average) being used as the velocity estimate.

If, for a specific object, the two estimated velocity components are not equal or are outside the threshold of one another ($v_D^{IM} \neq v_D^{DM}$), meaning that one (or both) the velocity measurements are ambiguous. In such embodiments, an unfolding-based velocity estimation is used to estimate the velocity of the object. The unfolding-based velocity estimation technique is used to expand the estimated velocity beyond the boundaries imposed by the time interval between two odd-indexed chirps. The direct/indirect velocity estimates (which are different if the velocity is ambiguous) can be expanded considering the different repetition interval. Unfolding may be performed by adding integer multiples of the velocity range to the initial ambiguous estimate (e.g., 2× the maximum velocity as given by the equation earlier). The velocity range is the difference between the biggest (positive) velocity and the small (negative) velocity. This range is different for the direct and indirect measurements. Then two sets of possible velocities are generated. The difference between all combinations of both sets is calculated and the combination corresponding to the smallest difference may be assumed to be the true velocity. The unfolding is done until a certain maximum velocity, e.g., 400 km/h is reached.

As specific examples, for the velocity component estimated using the Range-Doppler map, the unfolded velocity is:

$$v_D^{DM} + k\frac{3.6\lambda}{2(T_0 + 2T_{ACQ} + 2T_D)}, \text{ where } k = \mp 123 \ldots \ldots \ldots$$

For the velocity component estimated using the phase interferometry (or phase-difference) technique, the unfolded velocity is:

$$v_D^{IM} + n\frac{3.6\lambda}{2(T_0 + T_{ACQ} + T_D)} \text{ where } n = \mp 123 \ldots \ldots \ldots, \text{ and } n \neq k$$

If for a specific $k=\hat{K}$ and $n=\hat{N}$ results that:

$$\left| v_D^{DM} + k\frac{3.6\lambda}{2(T_0 + 2T_{ACQ} + 2T_D)} - v_D^{IM} - n\frac{3.6\lambda}{2(T_0 + T_{ACQ} + T_D)} \right| < \alpha \Delta V_{res}$$

Than the true velocity is $$v_D^{DM} + \hat{K}\frac{3.6\lambda}{2(T_0 + 2T_{ACQ} + 2T_D)},$$

where $\alpha=1, 2\ 3\ \ldots$, is an integer number that considers the possible frequency drift of the phase interferometry technique due to a low signal to noise ratio (SNR) values of the detected peaks.

Figure 2A:
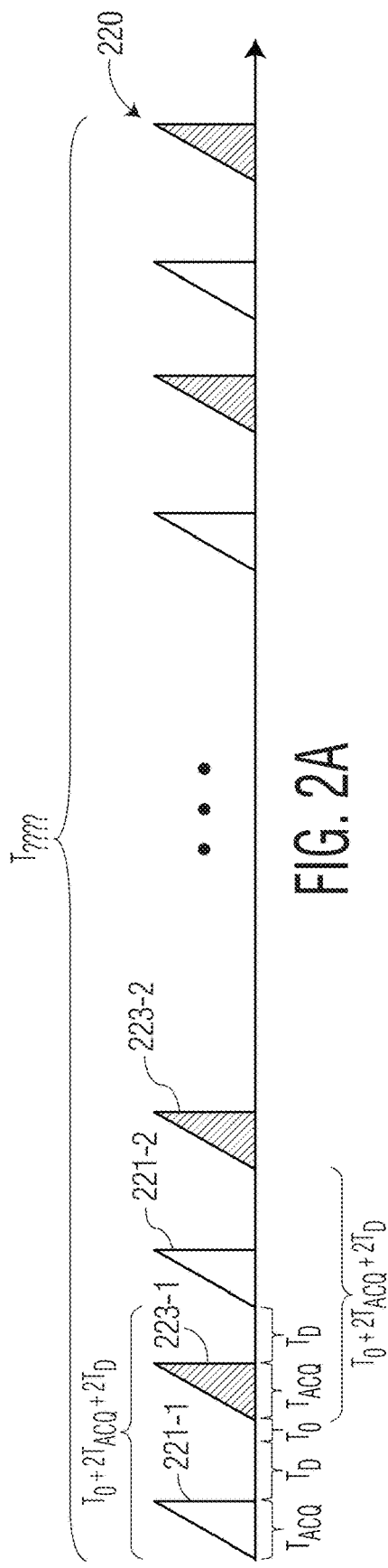
FIGS. 2A, 2B and 2C are used to show an example of interleaved chirp sequences generated by an apparatus of the type implemented in a manner consistent with one or more apparatuses disclosed herein in accordance with the present disclosure.
Figure 2B:
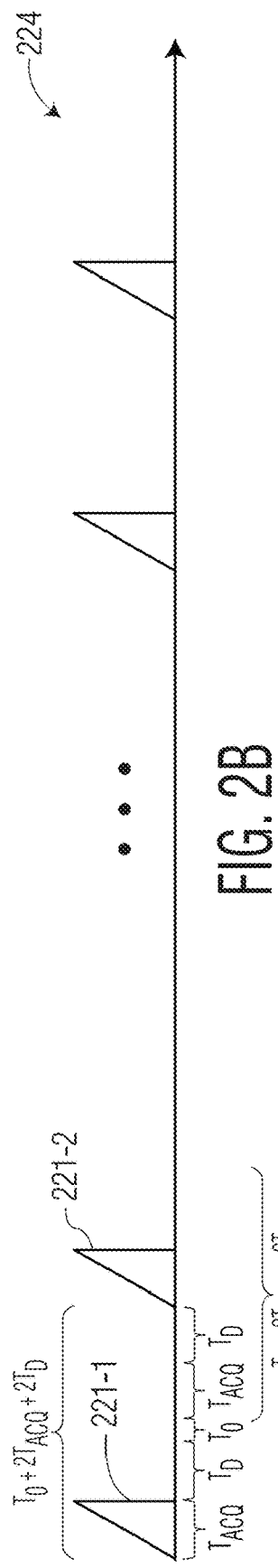
Figure 2C:
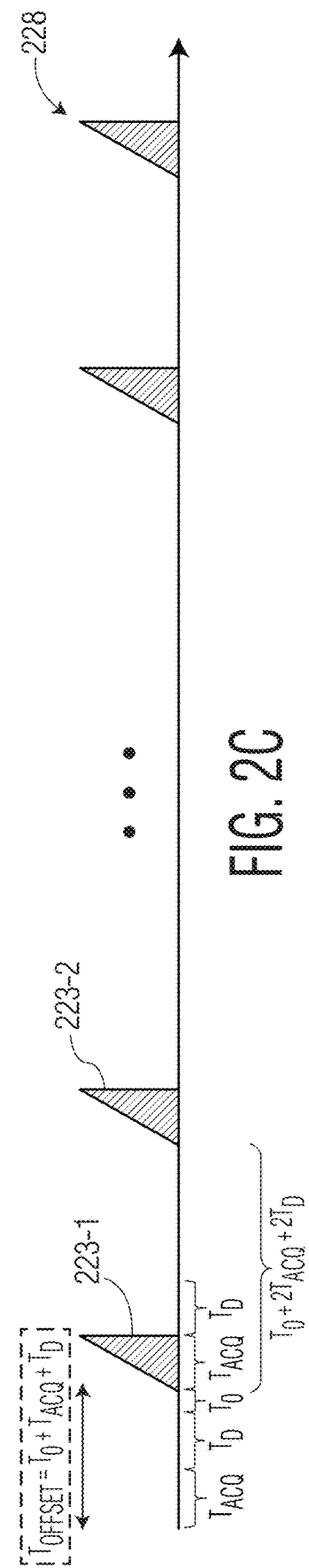

FIGS. 2A, 2B and 2C show an example of two interleaved chirp sequences generated by an apparatus of the type implemented in a manner consistent with one or more apparatuses disclosed herein in accordance with the present disclosure (such as consistent with FIG. 1). More specifically, the first time line 220 shows an example timing diagram of two interleaved chirp sequences having the measurement $T_{Meas}$. The two interleaved chirp sequences include even-indexed chirps 221-1, 221-2 and odd-indexed chirps 223-1, 223-2 which respectively are associated with one of the two interleaved chirp sequences.

As shown by the second time line 224 and third time line 228, the space between chirps of the same chirp sequence is the same for both chirp sequences, thus the interleaving of the chirps is asymmetrical. For example, the second time line 224 shows the even-indexed chirps 221-1, 221-2 and the third time line 228 shows the odd-indexed chirps 223-1, 223-2. The repetition time for both the second and third times lines 224, 228 is $T_0+2T_{ACQ}+2T_D$, with the offset time $T_0$ being placed between the odd-indexed chirps 223-1, 223-2 and the even-indexed chirps 221-1, 221-2. In one example (not necessarily corresponding to the example shown in FIG. 1), the offset time is placed after the end of an even-indexed chirp and before the start of an odd-indexed chirp, and is not placed after the end of the odd-indexed chirp (and before the start of the next even-indexed chirp). For example, the time between the end of the first even-indexed chirp 221-2 and the start of the first odd-indexed chirp 223-1 is $T_D+T_0$. The time between the end of the first odd-indexed chirp 223-1 and the start of the second even-indexed chirp 221-2 is $T_D$.

Figure 3:
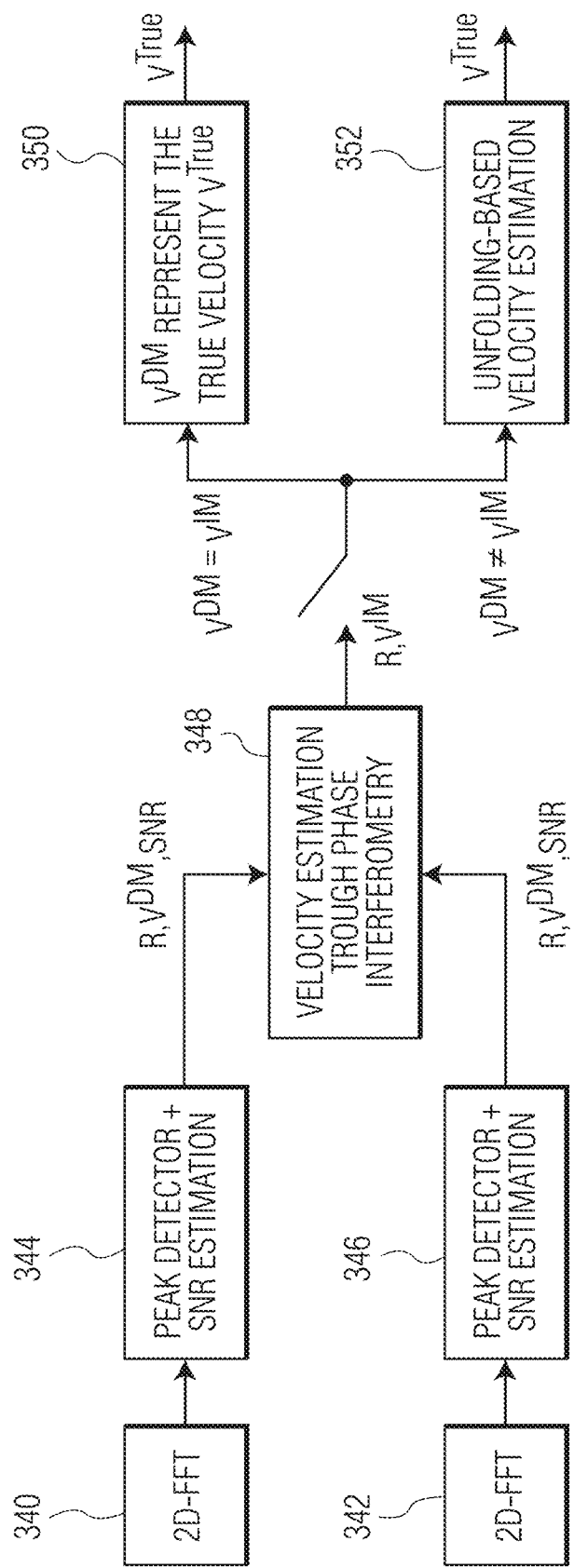
FIG. 3 is an example of processing the responsive chirps, in accordance with the present disclosure.

FIG. 3 is an example of processing the responsive chirps, in accordance with the present disclosure. As shown by FIG. 3, the chirps of each sequences are separately processed, with a first 2D-FFT 340 being generated for the odd-indexed chirps and a second 2D-FFT 342 being generated for the even-indexed chirps 342.

As previously described, a timing engine generates a periodic start signal. After each start signal, the TX of the front-end circuitry produces a chirp which may be provided to the antenna for transmission. The ensuing transmitted signal is reflected by objects and before being picked up by the receive antenna after it is down-mixed in the front-end circuitry. After mixing the received signal with the transmitted chip, the time delay results in a sinusoidal wave signal with a particular frequency. This signal is called the beat signal. After sampling the beat signal by an ADC in the front-end circuitry, it is further processed in the digital domain. From the beat signals, at 340 and 342, 2D-FFTs for each sequences are generated at 340 and 342 (e.g., range FFTs and velocity FFTs, resulting the range Doppler map). The resulting FFT output from each of the interleaved chirp sequences, at 340 and 342, contains peaks if objects are present at different distances (ranges). Peaks are identified for both the even and odd-indexed chirps, at 344 and 346, as well as signal-to-noise estimation may optionally be performed.

At 348, velocity estimation (or fine-distance/velocity estimation) may be performed, for example, based on a calculation or estimation of $V_{DM}$ (direct measure of velocity) being performed provided from block 344/346. At 348, an interpolation function may also be performed to extract most-accurate distance and velocity information from the range-Doppler map(s). While the velocity estimation may be provided as above, the indirect measure may be calculated by comparing the phase of the identified peaks. At 350, if the indirect measure and the direct measure of velocity match or are within a threshold, the direct measure of velocity is used as the velocity estimate for the object. If not, at 352, an unfolding-based velocity estimate is used to determine the velocity estimate.

Figure 4:
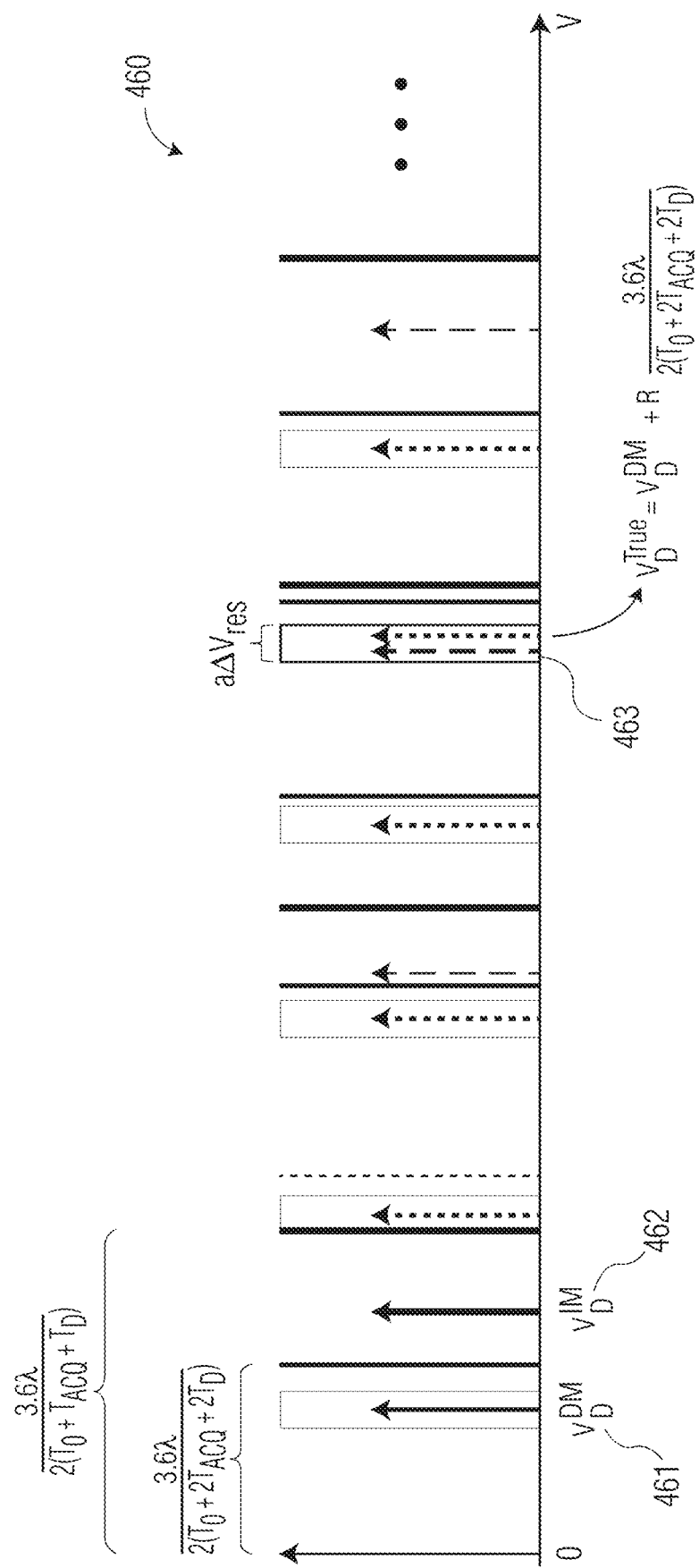
FIG. 4 is an example illustration of an unfolding-based velocity estimation, in accordance with the present disclosure.

FIG. 4 is an example illustration of an unfolding-based velocity estimation, in accordance with the present disclosure. As shown, the unfolding-based velocity estimation 460 includes assessing the indirect measure 462 and the direct measure 461 of velocity to identify a velocity at which the indirect measure 462 and the direct measure 461 match or are within a threshold, as shown by 463 (e.g., the closest match available is selected as the velocity estimate).

FIGS. 5A, 5B and 5C and FIGS. 6A, 6B and 6C show examples of emulated experiments and related experimental results as may be conducted in connection with more-detailed specific embodiments in a laboratory/simulation setting (e.g., an anechoic chamber using a target simulator) for purposes directed to such experiments. In such experiments, the maximum unambiguous velocity realized corresponds to ±37 km/h. The example experiments validate the ability of the embodiments described herein to detect ambiguous and non-ambiguous velocities.

Figure 5A:
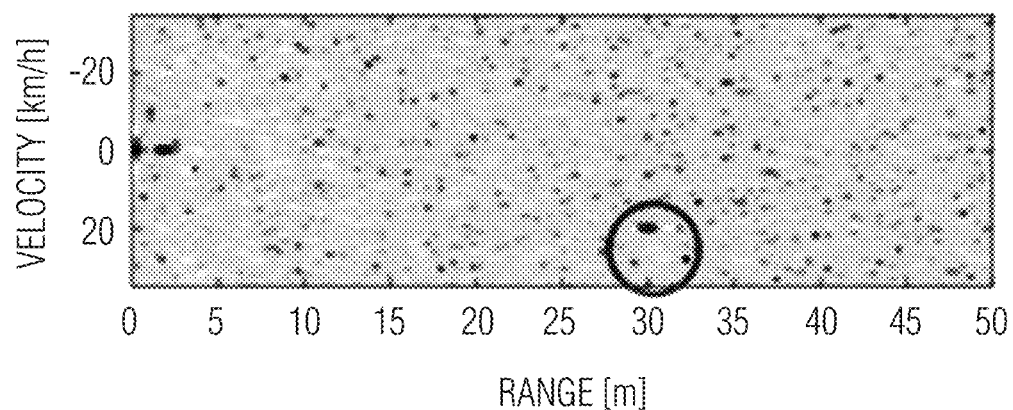
FIGS. 5A, 5B and 5C illustrate an example of estimating velocity, in accordance with the present disclosure.
Figure 5B:
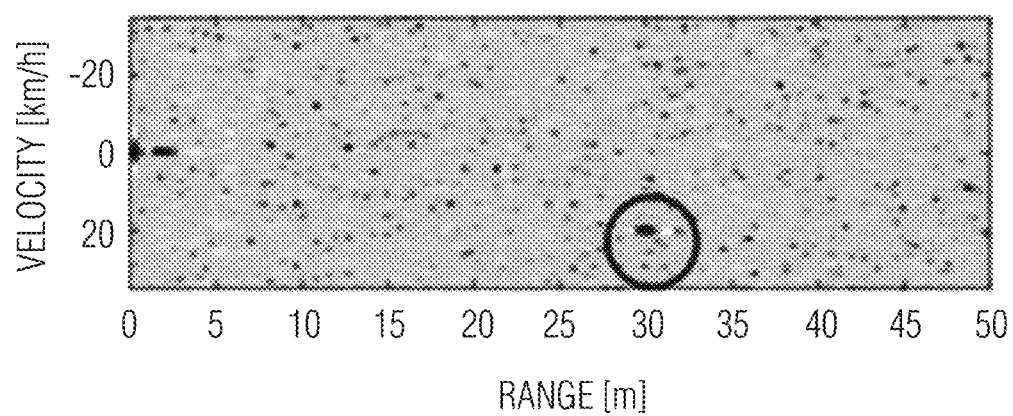
Figure 5C:
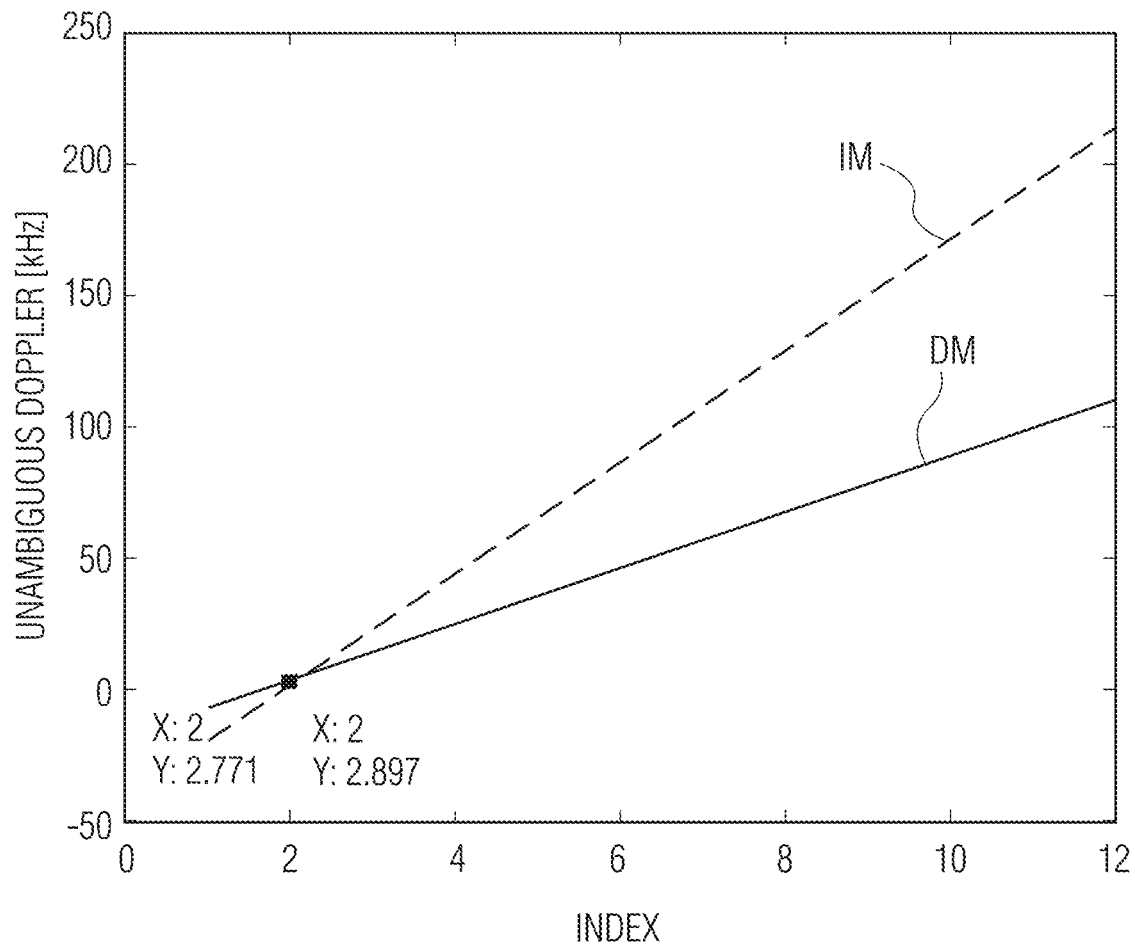

More specifically, FIGS. 5A, 5B and 5C illustrate an example of estimating velocity, in accordance with the present disclosure. In the example, the target is emulated at 30 m distance with an unambiguous velocity of 20 km/h. The output of the two range-Doppler maps are visible in FIGS. 5A and 5B, while the unfolded Doppler Frequency of the direct measurement (DM) and the indirect measurement (IM) obtained using the interferometric processing is depicted in FIG. 5C. The detected true Doppler frequency corresponds to 2.771 KHz which represents a velocity of about 20 km/h.

Figure 6A:
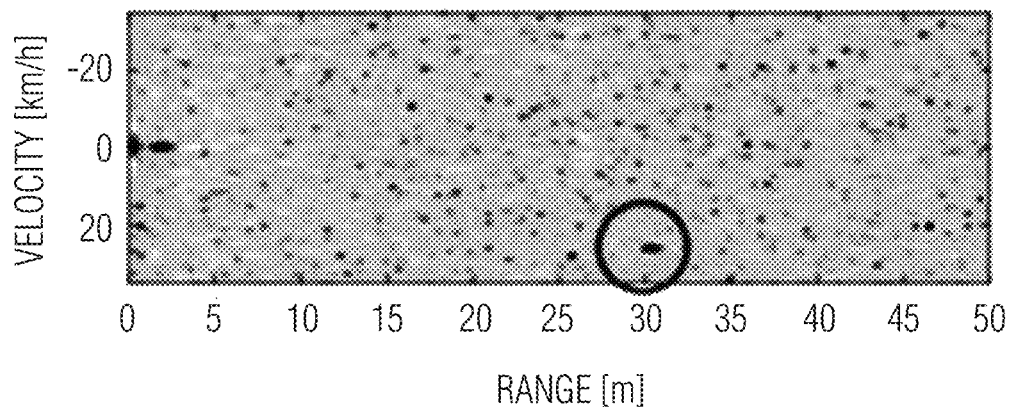
FIGS. 6A, 6B and 6C illustrate another example of estimating velocity, in accordance with the present disclosure.
Figure 6B:
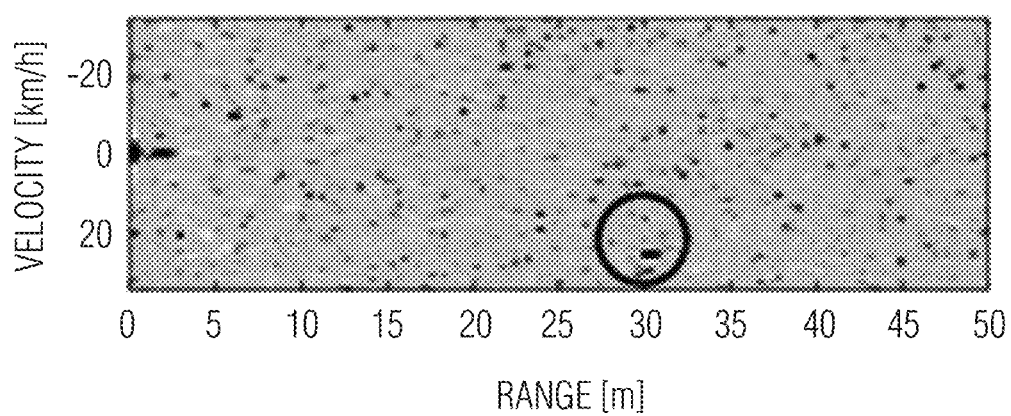
Figure 6C:
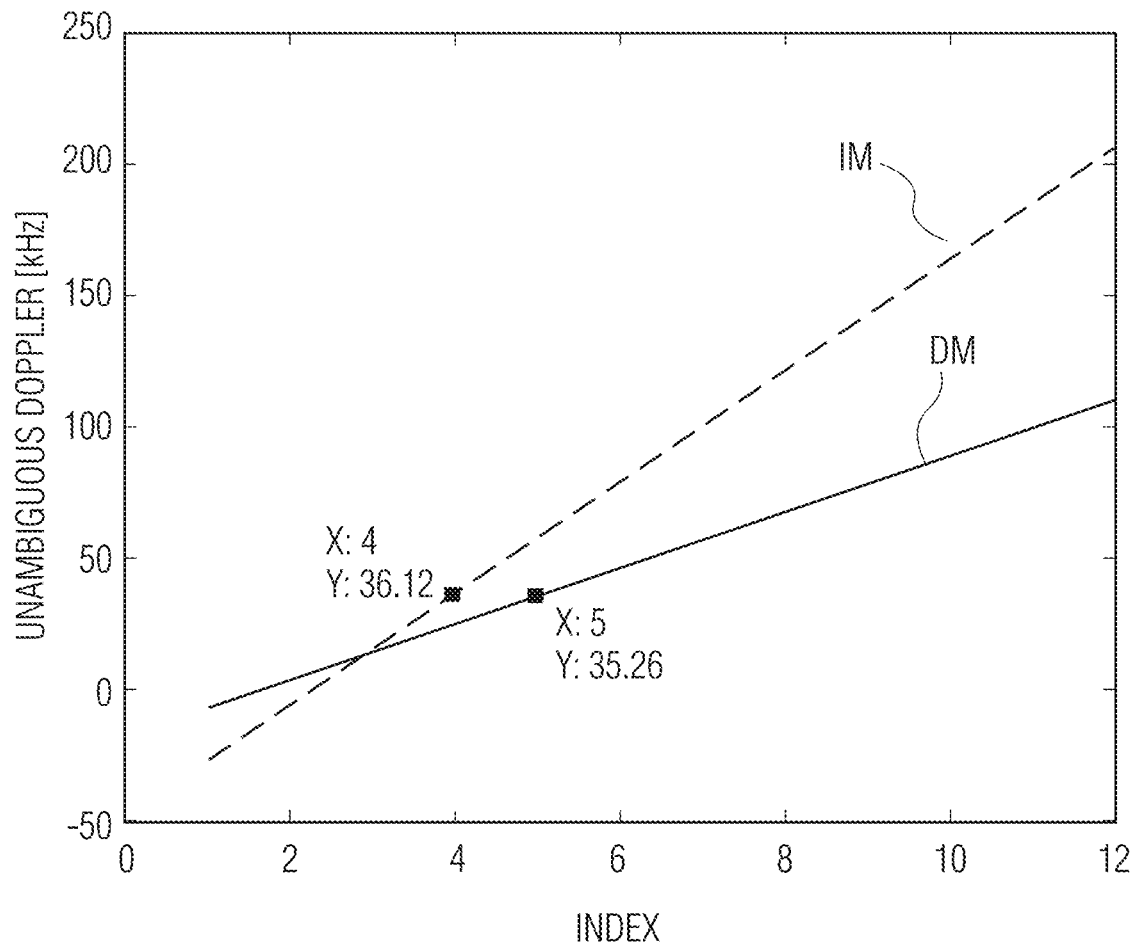

In FIGS. 6A, 6B and 6C, another example of estimating velocity is more specifically illustrated in accordance with the present disclosure. In the further example, the target is emulated at 30 m distance with an ambiguous velocity of 250 km/h. The output of the two range-Doppler maps are visible in FIGS. 6A and 6B, while the unfolded Doppler Frequency of the direct measurement (DM) and the indirect measurement (IM) obtained using the interferometric processing is depicted in FIG. 6C. The detected true Doppler frequency corresponds to 35.26 KHz which represents a velocity of about 250 km/h.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, circuitry and/or other circuit-type depictions (e.g., reference numerals 102, 104, 106 of FIG. 1 depicts a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 2A, 2B, 2C and FIGS. 3 and 4. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A radar method for determining a velocity of an object, the method comprising:
   in response to two interleaved chirp sequences being sent towards the object, wherein each of the interleaved chirp sequences is characterized by a common time spacing between respective chirps of the respective chirp sequence, and each chirp of one of the chirp sequences being offset by an amount of time that is different than the common time spacing, processing responsive chirps of each of the two interleaved chirp sequences independently—from one another, a first interleaved chirp sequence of the two interleaved chirp sequences processed by way of first circuitry to generate a first velocity estimate based on a first Doppler-spectrum data set and a second interleaved chirp sequence of the two interleaved chirp sequences processed by way of second circuitry to generate a second velocity estimate based on a second Doppler-spectrum data set, the second circuitry separate from the first circuitry; and
   calculating the velocity of the object based on first and second velocity estimates, wherein calculating the velocity of the object includes generating a direct estimate of the velocity of the object using at least one of the first velocity estimate or the second velocity estimate, and generating an indirect estimate of the velocity of the object using a phase difference between the two interleaved chirp sequences, wherein calculating the velocity of the object further includes comparing the direct estimate to the indirect estimate, and in response to indirect estimate being within a threshold of the direct estimate, calculating the velocity of the object as a value corresponding to the direct estimate, and in response to the indirect estimate being outside the threshold, calculating the velocity of the object using an unfolding-based velocity estimation.

2. The method of claim 1, further including generating and sending the two interleaved chirp sequences, and in response, receiving the responsive chirps corresponding to reflections of the chirps of the two interleaved chirp sequences from the object.

3. The method of claim 1, further including generating and sending the two interleaved chirp sequences as a single set of chirps, wherein chirps of one of the two interleaved chirp sequences include even-indexed chirps of the single set of chirps and wherein chirps of the other of the two interleaved chirp sequences include odd-indexed chips of the single set of chirps having the offset between the odd-indexed and even-indexed chirps.

4. The method of claim 3, wherein processing the responsive chirps includes processing the even-indexed chirps and the odd-indexed chirps separately, and in response, generating the first estimate of a velocity and range for the object using the even-indexed chirps and generating the second estimate of the velocity and range for the object using the odd-indexed chirps.

5. The method of claim 1, further including generating the direct estimate of the velocity of the object based on a weighted average of the first velocity estimate and the second velocity estimate.

6. The method of claim 1, wherein the unfolding-based velocity estimation comprises assessing the direct estimate of the velocity of the object and the indirect estimate of the velocity of the object to identify a velocity at which the direct estimate of the velocity of the object and the indirect estimate of the velocity of the object match or are within an unfolding threshold.

7. A radar method for determining a velocity of an object, the method comprising:
   sending two interleaved chirp sequences, each of the chirp sequences characterized by a common time spacing between respective chirps of the chirp sequence, and each chirp of one of the chirp sequences being offset by an amount of time that is different than the common time spacing;
   in response to sending the two interleaved chirp sequences, processing responsive chirps of each of the chirp sequences independently from one another, a first interleaved chirp sequence of the two interleaved chirp sequences processed by way of first circuitry to generate a first velocity estimate based on a first Doppler-spectrum data set and a second interleaved chirp sequence of the two interleaved chirp sequences processed by way of second circuitry to generate a second velocity estimate based on a second Doppler-spectrum data set, the second circuitry separate from the first circuitry; and
   calculating the velocity of the object based on the first and second velocity estimates, wherein calculating the velocity of the object includes generating a direct estimate of the velocity of the object using at least one of the first velocity estimate or the second velocity estimate, and generating an indirect estimate of the velocity of the object using a phase difference between the two interleaved chirp sequences, wherein calculating the velocity of the object further includes comparing the direct estimate to the indirect estimate, and in response to indirect estimate being within a threshold of the direct estimate, calculating the velocity of the object as a value corresponding to the direct estimate, and in response to the indirect estimate being outside the threshold, calculating the velocity of the object using an unfolding-based velocity estimation.

8. The method of claim 7, further including generating and sending the two interleaved chirp sequences as a single sequence of chirps via a radar transceiver.

9. The method of claim 7, wherein the offset is associated with a phase difference between detected peaks of the respective Doppler-spectrum data sets.

10. The method of claim 7, wherein calculating the velocity of the object further includes generating a distance of the object for each of the chirp sequences using the responsive chirps.

11. The method of claim 7, further including generating the direct estimate of the velocity of the object based on a weighted average of the first velocity estimate and the second velocity estimate.

12. The method of claim 7, wherein the unfolding-based velocity estimation comprises assessing the direct estimate of the velocity of the object and the indirect estimate of the velocity of the object to identify a velocity at which the direct estimate of the velocity of the object and the indirect estimate of the velocity of the object match or are within an unfolding threshold.

13. An apparatus comprising:
   circuitry to, in response to two interleaved chirp sequences being sent towards an object, process responsive chirps of each of the two interleaved chirp sequences independently from one another, a first interleaved chirp sequence of the two interleaved chirp sequences processed by way of first circuitry to generate a first velocity estimate based on a first Doppler-spectrum data set and a second interleaved chirp sequence of the two interleaved chirp sequences processed by way of second circuitry to generate a second velocity estimate based on a second Doppler-spectrum data set, the second circuitry separate from the first circuitry, each of the chirp sequences being characterized by a common time spacing between respective chirps of the chirp sequence, and each chirp of one of the sequences being offset by an amount of time that is different than the common time spacing; and
   calculate a velocity of the object based on the first and second velocity estimates, wherein calculating the velocity of the object includes generating a direct estimate of the velocity of the object using at least one of the first velocity estimate or the second velocity estimate, and generating an indirect estimate of the velocity of the object using a phase difference between the two interleaved chirp sequences, wherein calculating the velocity of the object further includes comparing the direct estimate to the indirect estimate, and in response to indirect estimate being within a threshold of the direct estimate, calculating the velocity of the object as a value corresponding to the direct estimate, and in response to the indirect estimate being outside the threshold, calculating the velocity of the object using an unfolding-based velocity estimation.

14. The apparatus of claim 13, wherein the circuitry is to process each of the two interleaved chirp sequences as waveforms, associated with the responsive chirps of each of the two interleaved chirp sequences, as a sample of a Doppler component.

15. The apparatus of claim 13, wherein the circuitry includes a radar transceiver to send the two interleaved chirp sequences as a single set of chirps in a radar frame and receive the responsive chirps, and processing circuitry to process the responsive chirps and calculate the velocity.

16. The apparatus of claim 13, wherein the circuitry includes a radar-signal frequency modulated continuous wave (FMCW) transmitter to send the two interleaved chirp sequences as a single set of chirps in a radar frame and receive the responsive chirps and processing circuitry to process the responsive chirps and calculate the velocity.

17. The apparatus of claim 13, wherein the circuitry includes a radar-signal frequency modulated continuous wave (FMCW) transceiver to send the two interleaved chirp sequences as a single set of chirps in a radar frame and receive the responsive chirps and processing circuitry to process the responsive chirps and calculate the velocity.

18. The apparatus of claim 13, further including generating the direct estimate of the velocity of the object based on a weighted average of the first velocity estimate and the second velocity estimate.

19. The apparatus of claim 13, wherein the unfolding-based velocity estimation comprises assessing the direct estimate of the velocity of the object and the indirect estimate of the velocity of the object to identify a velocity at which the direct estimate of the velocity of the object and the indirect estimate of the velocity of the object match or are within an unfolding threshold.

* * * * *